US009262136B2

(12) United States Patent
Skoglund et al.

(10) Patent No.: US 9,262,136 B2
(45) Date of Patent: Feb. 16, 2016

(54) ALLOCATE INSTRUCTION AND API CALL THAT CONTAIN A SYBMOL FOR A NON-MEMORY RESOURCE

(71) Applicant: Netronome Systems, Inc., Santa Clara, CA (US)

(72) Inventors: Espen Skoglund, Cambridge (GB); Rolf Neugebauer, Cambridge (GB); Francois Henri Theron, Village Crescent Rosendal (ZA); Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 274 days.

(21) Appl. No.: 14/074,640

(22) Filed: Nov. 7, 2013

(65) Prior Publication Data

US 2015/0128113 A1    May 7, 2015

(51) Int. Cl.
*G06F 9/45* (2006.01)
*G06F 9/445* (2006.01)

(52) U.S. Cl.
CPC ... *G06F 8/41* (2013.01); *G06F 8/54* (2013.01)

(58) Field of Classification Search
CPC ....................................................... G06F 9/45
USPC .................. 717/139, 140, 145, 146, 153, 162
See application file for complete search history.

(56) References Cited

U.S. PATENT DOCUMENTS

| 5,889,518 A | * | 3/1999 | Poreh | G06F 9/543 715/804 |
| 2003/0187854 A1 | * | 10/2003 | Fairweather | G06F 8/427 |
| 2005/0120122 A1 | * | 6/2005 | Farnham | H04L 69/32 709/230 |
| 2006/0143350 A1 | * | 6/2006 | Miloushev | G06F 9/5016 710/242 |

* cited by examiner

*Primary Examiner* — Chat Do
*Assistant Examiner* — Jae Jeon
(74) *Attorney, Agent, or Firm* — Imperium Patent Works LLP; T. Lester Wallace; Mark D. Marrello (57) ABSTRACT

A novel allocate instruction and a novel API call are received onto a compiler. The allocate instruction includes a symbol that identifies a non-memory resource instance. The API call is a call to perform an operation on a non-memory resource instance, where the particular instance is indicated by the symbol in the API call. The compiler replaces the API call with a set of API instructions. A linker then allocates a value to be associated with the symbol, where the allocated value is one of a plurality of values, and where each value corresponds to a respective one of the non-memory resource instances. After allocation, the linker generates an amount of executable code, where the API instructions in the code: 1) are for using the allocated value to generate an address of a register in the appropriate non-memory resource instance, and 2) are for accessing the register.

18 Claims, 9 Drawing Sheets

OBJECT CODE FOR ME1 AS
SUPPLIED TO THE LINKER
(BEFORE UNIQUIFICATION)

FIG. 6

OBJECT CODE FOR ME2 AS
SUPPLIED TO THE LINKER
(BEFORE UNIQUIFICATION)

FIG. 7

OBJECT CODE FOR ME1
(AFTER UNIQUIFICATION)

FIG. 9

OBJECT CODE FOR ME2
(AFTER UNIQUIFICATION)

FIG. 10

SYMBOL TABLE 75

LIST OF ALL RESOURCE INSTANCES THAT CAN BE ALLOCATED

| NAME OF THE RESOURCE INSTANCE | IS THE RESOURCE INSTANCE ALLOCATED? | ADDRESS OF THE RESOURCE INSTANCE | ORIGINAL SYMBOL | SCOPE OF THE SYMBOL | TARGET OF OBJECT CODE | UNIQUIFIED SYMBOL |
|---|---|---|---|---|---|---|
| LITTLEITEM 1,1 | NO | | | | | |
| LITTLEITEM 2,1 | YES | 0x100 | X2 | ISLAND | ISLAND1 | X2,1 |
| LITTLEITEM 3,1 | NO | | | | | |
| LITTLEITEM 4,1 | NO | | | | | |
| LITTLEITEM 1,2 | NO | | | | | |
| LITTLEITEM 2,2 | NO | | | | | |
| LITTLEITEM 3,2 | YES | 0x200 | X2 | ISLAND | ISLAND2 | X2,2 |
| LITTLEITEM 4,2 | NO | | | | | |
| LITTLEITEM 1,3 | NO | | | | | |
| LITTLEITEM 2,3 | NO | | | | | |
| LITTLEITEM 3,3 | NO | | | | | |
| LITTLEITEM 4,3 | NO | | | | | |
| LITTLEITEM 1,4 | NO | | | | | |
| LITTLEITEM 2,4 | NO | | | | | |
| LITTLEITEM 3,4 | NO | | | | | |
| LITTLEITEM 4,4 | NO | | | | | |
| BIGITEM 1 | NO | | | | | |
| BIGITEM 2 | YES | 0x300 | Y2 | GLOBAL | ISLAND 1&2 | Y2 |
| BIGITEM 3 | NO | | | | | |
| BIGITEM 4 | NO | | | | | |
| RING 1 | YES | 0x500 | R1 | GLOBAL | | |
| RING 2 | YES | 0x600 | R2 | GLOBAL | | |
| RING 3 | YES | | | GLOBAL | | |
| RING 4 | YES | | | GLOBAL | | |

THERE ARE THREE POOLS OF RESOURCE INSTANCES TO BE ALLOCATED:
1) "LITTLEITEM" REGISTERS,
2) "BIGITEM" REGISTERS, AND
3) RINGS.

SYMBOL TABLE

FIG. 8

EXECUTABLE CODE FOR ME1 AND ME2

OPERATION OF THE LINKER

ALLOCATE INSTRUCTION AND API CALL THAT CONTAIN A SYBMOL FOR A NON-MEMORY RESOURCE

TECHNICAL FIELD

The described embodiments relate generally to linkers and to the allocation of resource instances in the generation of executable code, and more particularly to the generation of executable code for multiprocessor systems.

BACKGROUND INFORMATION

A computer system may have several embedded processors. To program the embedded processors, an amount of source code may be written for each processor. The C programming language is often used. The C source code for each processor is compiled by a C compiler into a corresponding amount of object code. The amounts of object code are then converted by a linker into corresponding amounts of executable code. The amount of executable code for a first of the embedded processors is loaded into program memory of the first embedded processor, and the amount of executable code for a second of the embedded processors is loaded into program memory of a second embedded processor, and so forth. After loading, each processor executes its respective amount of executable code.

It may be desired that some memory of the computer system only be accessible and usable by only one of the processors, whereas another part of the memory should be accessible and usable by all of the processors. A header file is therefore typically written to accompany the source code. The header file declares arrays of memory resources, variables and functions, and contains an indication of which parts of code should be able to access each of the declared identifiers. For example, if a memory array is to be referred to by a symbol name, and if two parts of the code are be able to access the same memory array, then the same symbol name set forth in the header file will be used in the two parts of code to refer to the same memory array. If another memory array is only to be accessible by one of the parts of the code, then a symbol representing that memory array will only be used in the appropriate part of the code. There are several ways of preparing the code to accomplish this, but a header file is typically used to record which parts of the code are to be able to use which declared identifier. The content of the header file is managed by the programmer.

SUMMARY

In a first novel aspect, a source code symbol can be declared to have a scope level indicative of a level in a hierarchy of scope levels, where the scope level indicates a circuit level, or a sub-circuit level. Location information is supplied to a linker program. The location information indicates where different amounts of the object code are to be loaded into a system. The system may, for example, be an integrated circuit having islands. The location information may indicate that a first amount of code is to be loaded into program memory in a first island so that the first code can be executed by a first processor on the first island, and that a second amount of code is to be loaded into program memory in a second island so that the second code can be executed by a second processor on the second island, and so forth. A novel linker program uses the location information, and the scope level information of the symbol, to uniquify instances of the symbol if necessary to resolve name collisions of symbols having the same scope. If, for example, the scope level of the symbol is "island" and if object code for multiple islands includes the same symbol, then instances of the symbol appearing in the object code for an island are replaced with a uniquified symbol that does not appear in the object code for any other island. If a symbol has a scope level of global, however, then no symbol uniquification is performed. The same symbol can appear in the code for all the islands. After the symbol uniquification step, the linker performs a resource allocation step. A resource instance is allocated to each symbol. After resource allocation, the linker replaces each instance of the symbol in the object code with the address of the allocated resource instance. The resulting executable code is then loaded into the system so that the different amounts of executable code are loaded into the correct places in the system as indicated by the location information.

In a second novel aspect, a linker allocates resource instances of a non-memory resource. A declare instruction is used to declare a pool of the non-memory resource instances. An allocate instruction is then used to instruct the linker to allocate a non-memory resource instance from the pool to be associated with a symbol. The symbol is then usable in source code to refer to the corresponding non-memory resource instance. At link time, the linker program allocates non-memory resource instances to symbols in accordance with the allocate instructions. The linker then replaces each instance of the symbol in the object code with the address of the corresponding allocated resource instance, thereby generating executable code. Examples of non-memory resource instances include hardware ring circuits and hardware event filter circuits.

In a third novel aspect, a declare instruction can be used to declare a sub-pool of resource instances to be taken from the resource instances of a larger declared pool. In this way, a hierarchy of pools and sub-pools can be declared using declare instructions. Allocate instructions can then be used to instruct the novel linker to make allocations from a desired pool or a desired sub-pool of the hierarchy. Although the three novel aspects are set forth above separately, multiple ones of the novel aspects can be provided together in various embodiments. For example, hierarchical pools of non-memory resources can be declared, and then multiple allocations can be made from the pools or sub-pools where the allocations have different scopes.

In a fourth novel aspect, a first amount of code is received onto a compiler. The first amount of code includes an allocate instruction and an API (Application Programming Interface) call. The allocate instruction includes a symbol that identifies one of a plurality of non-memory resource instances. The API call is a call to perform an operation on one of the non-memory resource instances. The API call includes the symbol, and the symbol of the API call indicates that the particular non-memory resource instance that the API call is to operate on is the very same non-memory resource instance of the allocate instruction. After receiving the allocate instruction and the API call, the compiler replaces the API call in the first amount of code with a plurality of API instructions. A linker then allocates a value to be associated with the symbol, where the value is one of a plurality of values, and where each value corresponds to a respective one of the plurality of non-memory resource instances. After the allocation operation, the linker generates and outputs a second amount of executable code. The executable code includes the API instructions. Eventual execution of the API instructions will cause the allocated value to be used to generate an address of a register, where the register is a register in the particular non-memory resource instance indicated by the symbol in the API call.

After the address of the register has been generated, further execution of the executable code will cause the register to be accessed in a way specified by the API call. In one specific example, the API call is a call to perform a write to a configuration register of a particular non-memory resource instance, where the particular non-memory resource instance is identified by the symbol. In another specific example, the API call is a call to perform a PUT to a particular hardware ring circuit, where the particular hardware ring circuit is identified by the symbol. In another specific example, the API call is a call to perform a GET from a particular hardware ring circuit, where the particular hardware ring circuit is identified by the symbol. In another specific example, the API call is a call to write data to an event filter circuit, where the particular event filter circuit is identified by the symbol. In another specific example, the API call is a call to receive data from an event filter circuit, where the particular event filter circuit is identified by the symbol.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 13 illustrates the operation of the novel linker in a graphical form.

DETAILED DESCRIPTION

Reference will now be made in detail to background examples and some embodiments of the invention, examples of which are illustrated in the accompanying drawings.

Figure 1:
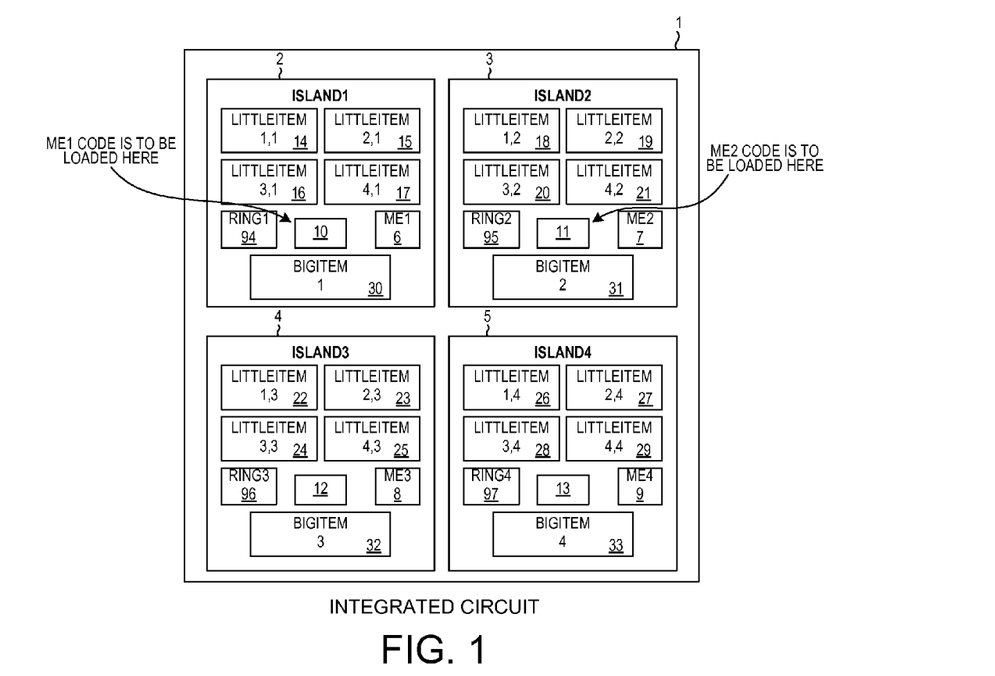
FIG. 1 is a simplified top-down diagram of a multiprocessor integrated circuit for which executable code is to be generated.

FIG. 1 is a simplified diagram of an integrated circuit 1 to be programmed. Integrated circuit 1 includes four islands 2-5. Each island has a microengine (ME) processor and an amount of program memory. Reference numerals 6-9 identify the processors and reference numerals 10-13 denoted the program memories. In addition, each island includes a number of resource instances. In this simplified example, there are three types of resource instances, littleitem resources, bigitem resources, and ring resource instances. Each littleitem resource instance is a single read/write memory location that can be accessed at a known and fixed address as determined by the hardware structure of the integrated circuit. Similarly, each bigitem resource instances is a single read/write memory location that can be accessed at a known and fixed address as determined by the hardware structure of the integrated circuit. Reference numerals 14-29 identify the littleitem resources. Reference numerals 30-33 identify the bigitem resources. In the example of FIG. 1, the processor of an island can read from or write to any particular littleitem or bigitem resource instance on the integrated circuit via a bus structure (not shown). Reference numerals 94-97 identify the four ring resource instances.

Figure 2:
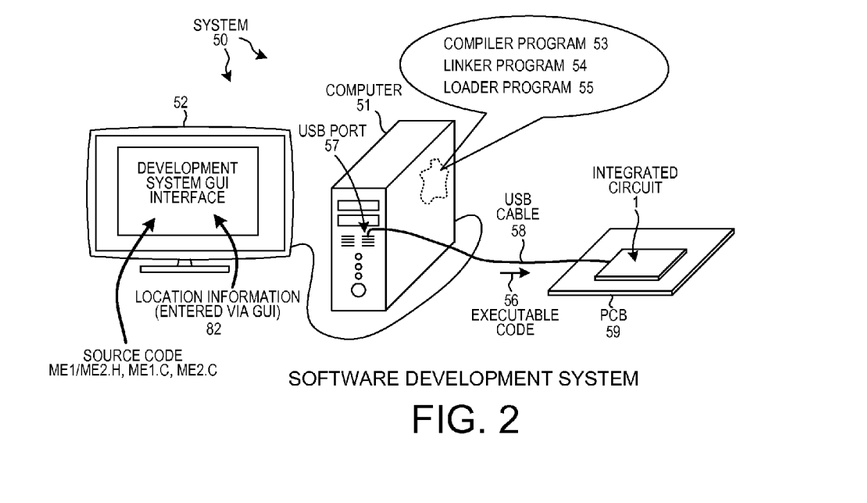
FIG. 2 is a diagram of a system usable to generate executable code for the integrated circuit of FIG. 1.

FIG. 2 is a diagram of a software development system 50 used to develop executable code for the processors of the integrated circuit 1 of FIG. 1. The system 50 includes a computer 51 having a display 52 and a keyboard (not shown). A compiler program 53, a linker program 54, and a loader program 55 are stored (for example, on a magnetic hard disc or in semiconductor memory) in the computer. The magnetic hard disc and semiconductor memory are processor-readable media that are readable by the CPU (Central Processing Unit) of the computer 51. A programmer writes a source code program or programs in a programming language such as the C programming language using computer 51. The C source code is then compiled by the compiler program 53 into object code. The linker program 54 is then used to convert the object code into executable code 56. The loader program 55 is then used to load the executable code into the integrated circuit 1 via USB port 57 and cable 58. The integrated circuit 1 is disposed on a PCB 59 for this purpose, and receives the executable code 56 via the cable 58. In the particular example described here, an amount of executable code for the first processor 6 of island1 is loaded into program memory 10 and an amount of executable code for the second processor 7 of island2 is loaded into program memory 11. Once the executable code has been loaded, the processors 6 and 7 can then execute their respective amounts of code.

In a first novel aspect, a source code symbol can be declared to have a scope level indicative of a level in a hierarchy of scope levels, where the scope level indicates a circuit level, or a sub-circuit level. In one example, the source code for the processor in island1 is to include a symbol X2, where this symbol refers to one of the littleitem resources. At the same time, the source code for the processor in island2 is to include the same symbol X2, but this symbol as used in this amount of source code is to refer to another of the littleitem resources. The source code for the second processor is nearly identical to the source code for the first processor, yet reference to the X2 symbol in the code of the first processor 6 is not to refer to the particular littleitem register used by second processor 7, and reference to the X2 symbol in the code of second processor 7 is not to refer to the particular littleitem register used by the program executing on first processor 6. In addition to the two littleitem resource instances used by two programs, the two instances of the source code are both to use a common single instance of the bigitem resource. An instance of the symbol Y2 appearing in the code for the first processor 6 is to refer to the same bigitem register that an instance of the symbol Y2 appearing in the code for the second processor 7 refers to.

Rather than having to use different symbols to manage manually which of the resource instances as described in the background information section above, the new declare instruction is used and a new allocate instruction is used. The new instructions are usable to declare a symbol to have a scope level in a hierarchy of scope levels, where the scope levels correspond to circuit and sub-circuits within the integrated circuit.

Figure 3:
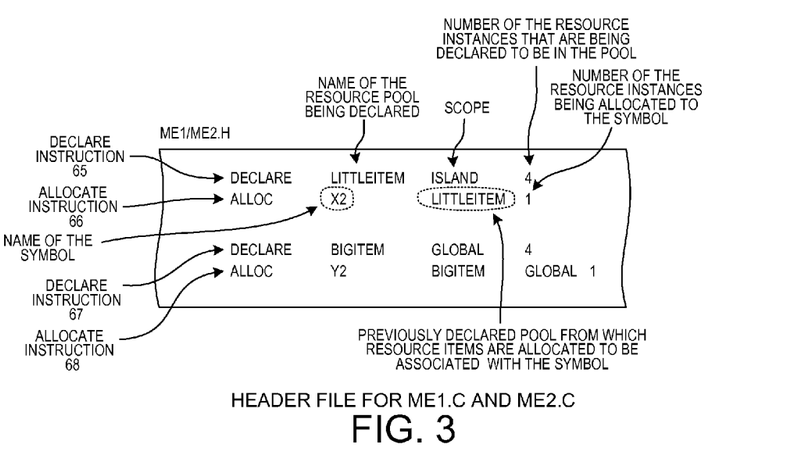
FIG. 3 is a diagram of a header file that contains instructions to declare a symbol to have a scope level indicative of a level in a hierarchy of scope levels, where the scope level indicates a circuit level, or a sub-circuit level within the integrated circuit of FIG. 1.

FIG. 3 is a simplified diagram that illustrates a header file ME1/ME2/H for the example of the first novel aspect. In the first declare instruction 65, four resource instances of type littleitem are being declared to have a pool name of "LITTLEITEM" where the pool name is of scope level "island". The first allocate instruction 66 indicates that the linker is to allocate one of these littleitems to be associated with the symbol X2. Use of the symbol X2 in the program source code for the processor 6 of island1 will therefore refer to a first littleitem, whereas use of the same symbol X2 in the program source code for the processor 7 of island2 will refer to a second littleitem, due to scope level of the symbol X2 being "island". The header file of FIG. 3 also includes a second declare instruction 67. Second declare instruction 67 declares four resource instances of the type "bigitem" to have a pool name of "BIGITEM" where the pool name is of scope level "global". The second allocate instruction 68 indicates that one of these bigitem resource instances is to be allocated to be associated with the symbol Y2. Because the Y2 symbol has a scope level of "global", use of the Y2 symbol in the program source code for the processor 6 of island1 will therefore refer to the same particular bigitem resource instance as does use of the Y2 symbol in the program source code for the processor 7 of island2.

The scope level of "island" of a symbol in accordance with this embodiment does not just require that the resolved symbol be unique in a particular section of code, or be unique in a particular section of code that is to be loaded into a particular part of memory, but rather the scope level of "island" requires that the symbol be unique within an "island" into which the code that contains the symbol is to be loaded. An island is a particular type of hardware structure. The linker is supplied with location information that indicates the island into which the code (code that contains the symbol) is to be loaded, and more particularly in one example the island and a particular microengine program memory within that island. The linker uses this special type of location information to uniquify the symbol in accordance with the scope level set forth in the allocate instruction.

Figure 4:
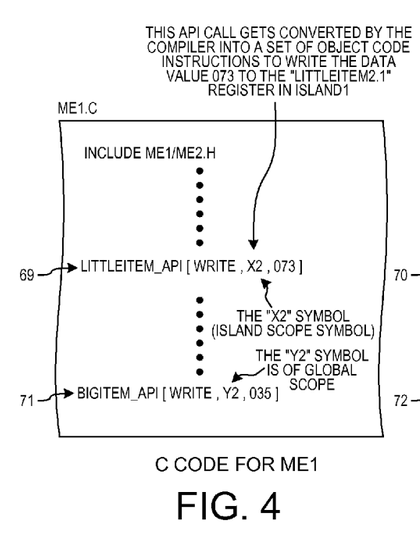
FIG. 4 is a diagram of an amount of C source code for a first processor of the multiprocessor integrated circuit of FIG. 1.

FIG. 4 is a diagram that illustrates an amount of source code ME1.0 for execution by the first processor 6. The line 69 is an Application Programming Interface (API) call that includes the X2 symbol as a parameter of the call. The API call is used in the source code to cause a write of the value 073 into the littleitem resource X2.

Figure 5:
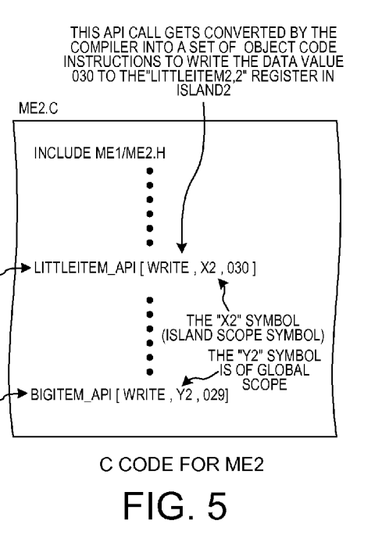
FIG. 5 is a diagram of an amount of C source code for a second processor of the multiprocessor integrated circuit of FIG. 1.

FIG. 5 is a diagram that illustrates an amount of source code ME2.0 for execution by the second processor 7. The line 70 is an API call that includes the X2 symbol as a parameter of the call. This API call is used in the source code to cause a write of the value 030 into the littleitem resource X2. Even though the same symbol X2 appears in the source code of FIGS. 4 and 5, the symbol X2 is declared in the header file of FIG. 3 to be of scope level "island". Accordingly, the reference to X2 in the code of FIG. 4 is to refer to a different littleitem resource instance than is the reference to X2 in the code of FIG. 5.

FIG. 4 also includes an API call 71 that includes the Y2 symbol. API call 71 is to cause a write of the value 035 into the bigitem resource Y2. FIG. 5 includes an API call 72 that includes the Y2 symbol. API call 72 is to cause a write of the value 029 into the bigitem resource Y2. Because the symbol Y2 is declared in the header file of FIG. 3 to be of scope level "global", references to the symbol Y2 in the code of both FIG. 4 and FIG. 5 will all refer to the same one resource instance of bigitem.

Figure 6:
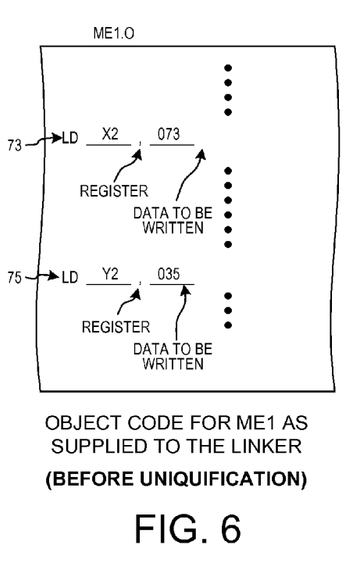
FIG. 6 is a diagram of the object code that results from compilation of the source code of FIG. 4.
Figure 7:
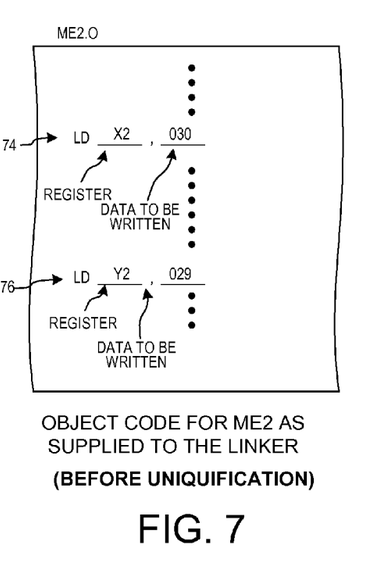
FIG. 7 is a diagram of the object code that results from compilation of the source code of FIG. 5.

The header file ME1/ME2.H and the source code files ME1.0 and ME2.0 having the new declare and new allocate instructions are compiled by compiler program 53, thereby generating an amount of object code ME1.O for the processor of island1 and an amount of object code ME2.O for the processor of island2. FIG. 6 illustrates the amount of object code for the first processor of island1. FIG. 7 illustrates the amount of object code for the second processor of island2. Note that the compiler has replaced each API call appearing in the source code with a set of lower level instructions that cause the desired operation of the API call to be carried out. In the simplified example being described here, the API call 69 of FIG. 4 was to cause a write of the value 073 into the X2 littleitem resource instance. Accordingly, the object code in FIG. 6 includes a load instruction 73 to load the value 073 into the resource instance identified by symbol X2. Similarly, the API call 70 of FIG. 5 has been replaced with a load instruction 74 in the object code of FIG. 7. Although not shown in FIGS. 6 and 7, the declare instructions and the allocate instructions of the source code header file of FIG. 3 are present in the two amounts of object code due to the "INCLUDE ME1/ME2.H" instructions in each of the source code files. The declare and allocate instructions just pass through the compiler as text, and appear one for one as text in the object code output of the compiler. In another example, the declare and allocate instructions just pass through the compiler in a binary form into the resulting object file.

Next, the amounts of object code of FIGS. 6 and 7, along with the declare and allocate instructions as passed through the compiler, are supplied to the linker program 54. The linker is also supplied with location information 82 (see FIG. 2) that indicates where in the integrated circuit 1 the object code ME1.0 is to be loaded, and where in the integrated circuit the object code ME2.0 is to be loaded. In one example, the location information 82 is supplied by the programmer using a linker script that is interpreted by the linker program 54. In another example, the location information 82 is supplied by the programmer using a command line interface of a GUI interface (see FIG. 2) to the linker. In the present example, the location information 82 indicates that the object code of ME1.0 is to be loaded into the first island1 2, and the object code of ME2.0 is to be loaded into the second island2 3.

Figure 8:
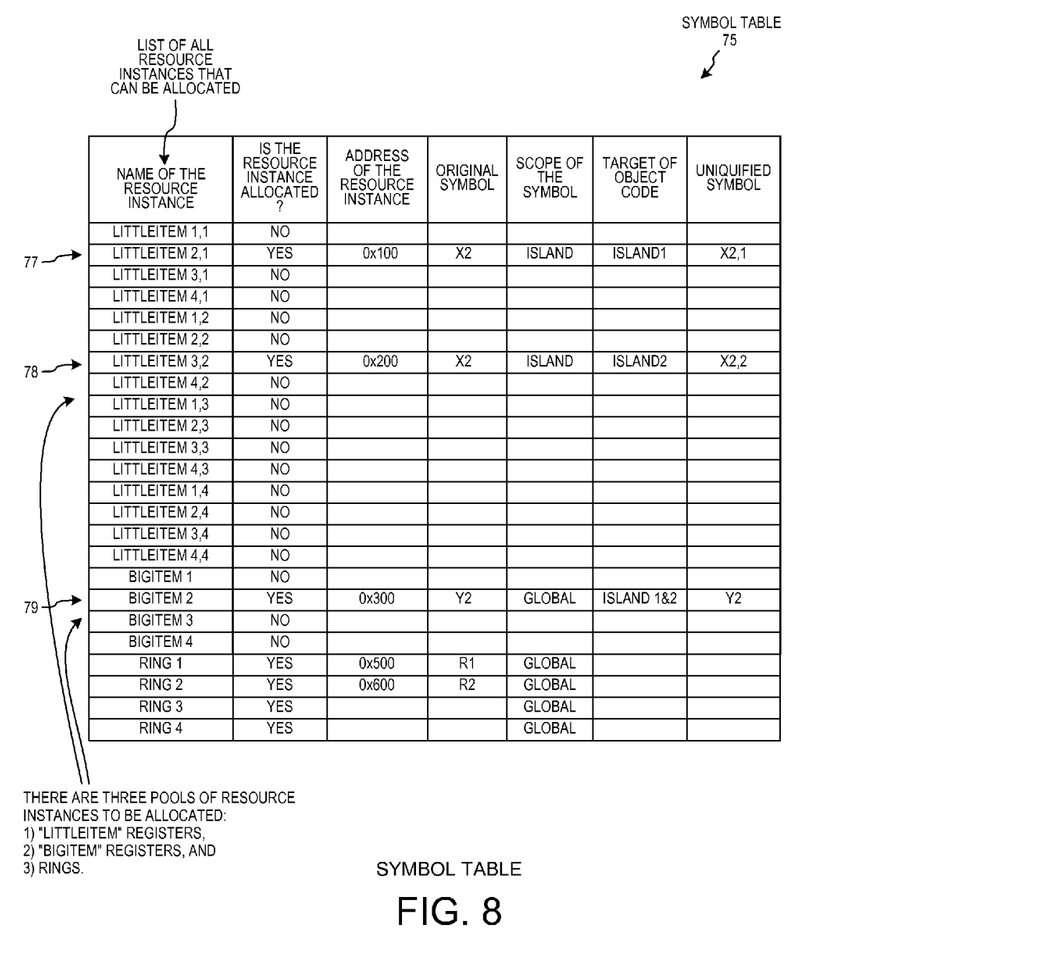
FIG. 8 is a diagram that illustrates a symbol table used by the linker program of the system of FIG. 2.

The linker program 54 then builds a symbol table 75. FIG. 8 is a diagram of symbol table 75. Symbol table 75 has a row for each resource instance on the integrated circuit 1 that can be allocated. In the example of the integrated circuit of FIG. 1, there are sixteen resource instances of type littleitem, and there are four resource instances of type bigitem. The linker program 54 traverses through the object code of FIGS. 6 and 7 and records into the symbol table the scope level for each symbol encountered. The linker program 54 then processes through the object code in a novel symbol "uniquification" operation. If a symbol is defined to have a scope level "island", then all usages of the symbol within code to be executed on an island are to refer to the same resource instance, but are to be "unique" with respect to usages of the symbol appearing in code to be executed on other islands. Accordingly, when the linker processes the code and encounters a symbol (such as symbol X2) that has a scope level of "island", the linker uses the island number to modify the X2 symbol so that after uniquification instances of the symbol in the code for the processor of one island will be different from instances of same symbol in the code for the processor of another island. In the example described here, a symbol (of scope level "island") appearing in code to be executed on an island is uniquified by adding the island number to the symbol name, thereby generating a modified symbol name. For example, the symbol X2 (of scope level "island") appearing in object code of FIG. 9 for execution by processor 6 of the first island1 is modified by adding the island number "1" to the symbol X2, thereby generating a unique symbol X2,1. All instances of the X2 symbol appearing in the object code of FIG. 6 are replaced with the uniquified symbol X2,1. In the same way, the symbol X2 appearing in code for the processor 7 of the second island2 is modified by adding the island number "2" to the symbol X2, thereby generating a unique symbol X2,2. All instances of the X2 symbol appearing in the object code of FIG. 7 are replaced with the uniquified symbol X2,2. When the linker encounters an instance of the symbol Y2 appearing the lines 75 and 76 of the object code of FIGS. 6 and 7, however, the linker recognizes that the scope level of the symbol Y2 is global. The linker therefore does not uniquify instances of the Y2 symbol.

Figure 9:
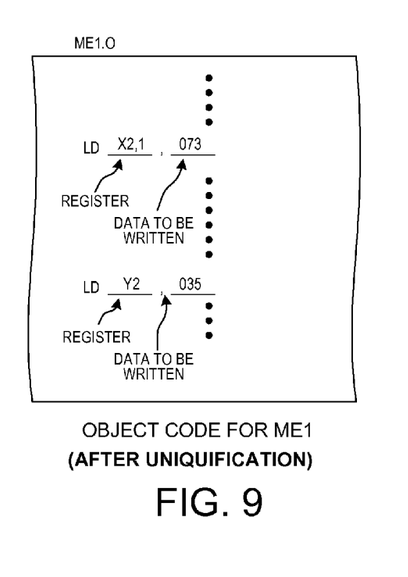
FIG. 9 is a diagram that illustrates how the object code of FIG. 6 is changed as a result of a novel symbol uniquification operation performed by the linker of the system of FIG. 2.
Figure 10:
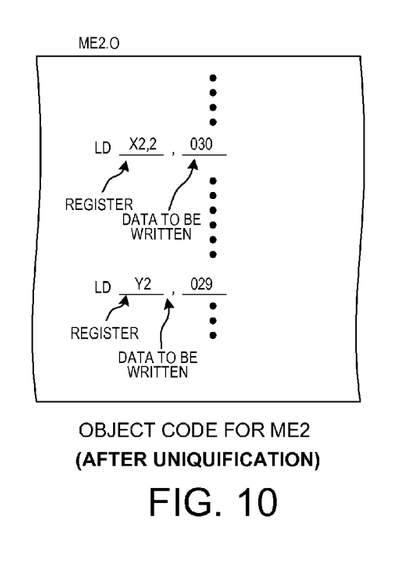
FIG. 10 is a diagram that illustrates how the object code of FIG. 7 is changed as a result of the novel symbol uniquification operation performed by the linker of the system of FIG. 2.

FIGS. 9 and 10 show the results of the uniquification operation. Note that instances of the symbol X2 in the code of FIG. 6 has been replaced with the uniquified symbol X2,1. Also, instances of the symbol X2 in the code of FIG. 7 have been replaced with the uniquified symbol X2,2. Instances of the symbol Y2 in the code of FIGS. 6 and 7 have not been modified.

The linker then performs allocation on the modified object code of FIGS. 9 and 10. As a result of the declare and allocate instructions, the resource instance littleitem2,1 is allocated to be associated with the uniquified symbol X2,1. The scope level of the symbol x2,1 is "island". This information is recorded in row 77 of the symbol table of FIG. 8.

Similarly, another littleitem resource instance littleitem3,2 is allocated to be associated with the uniquified symbol X2,2. The scope level of the symbol x2,1 is "island", and this information is recorded in row 78 of the symbol table of FIG. 8.

A resource instance of type bigitem is allocated to be associated with the symbol Y2. Due to the symbol Y2 being of global scope, only one bigitem is allocated. This allocation is recorded in row 79 of the symbol table of FIG. 8.

Figure 11:
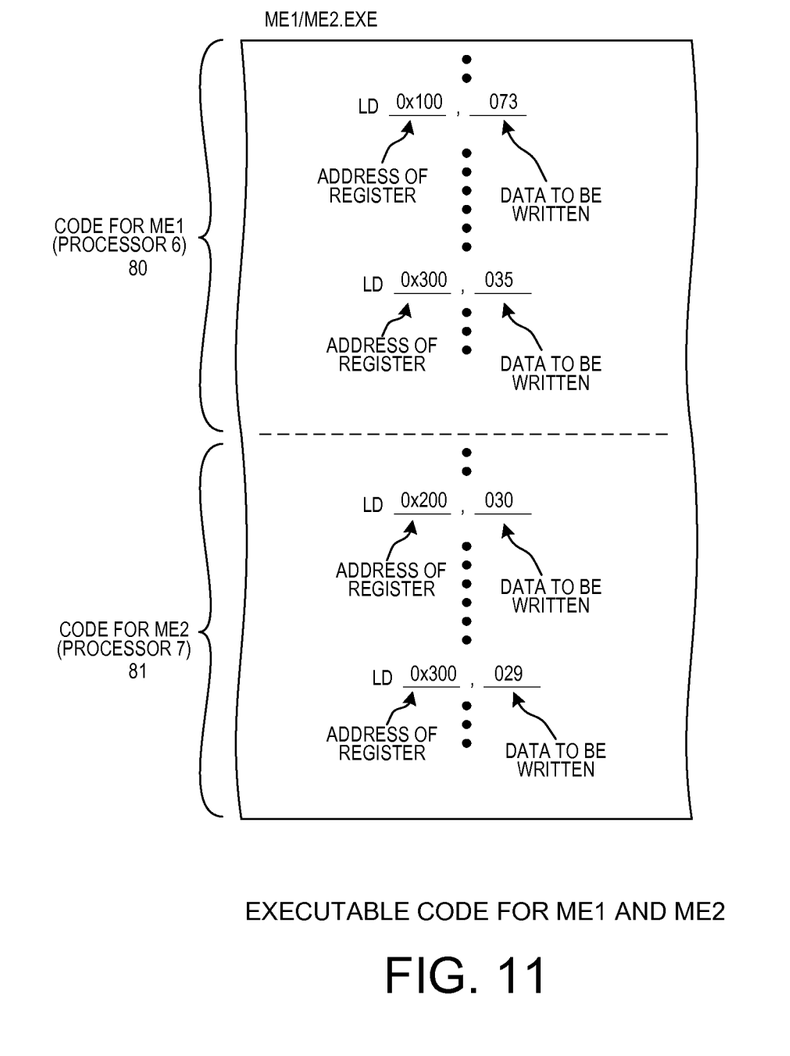
FIG. 11 is a diagram of executable code output by the linker, where a first amount of the executable code is for a first processor in the multi-processor integrated circuit and where a second amount of the executable code is for a second processor in the multi-processor integrated circuit.

Once resource instances have been allocated to all the uniquified symbols, the linker program 54 patches each instance of a symbol appearing in the modified object code with the associated value of the symbol. In the example described here, the resource instances are memory locations in the integrated circuit. A single memory location is also referred to here as a register. Accordingly, the value to be associated is an address in this example. Accordingly, the value to be associated is an address in this example. Due to the linker's knowledge of the structure of the integrated circuit, the linker is aware of the address of each of these memory locations. The address of a particular memory location is fixed and determined by the hardware of the integrated circuit. In the present example, littleitem2,1 has an address of 0x100, littleitem2,2 has an address of 0x200, and bigitem has an address of 0x300. In the patching operation, the linker program 54 replaces each instance of the symbol X2,1 with the address 0x100 of the resource instance that has been allocated to symbol X2,1. Similarly, the linker program 54 replaces instance of the symbol X2,2 with the address 0x200 of the resource instance that has been allocated to symbol X2,2, and the linker replaces instances of the symbol Y2 with the address 0x300 of the resource instance that has been allocated to symbol Y2. The result of these replacements is an amount 80 of executable code for the processor 6 of island1, and an amount 81 of executable code for the processor 7 of island2. This code is output from the linker as a single file ME1/ME2.EXE. FIG. 11 is a diagram of the executable code of the file ME1/ME2.EXE.

Next, the loader program 55 is used to load the executable code of FIG. 11 into the integrated circuit 1 so that the amount 80 of executable code for processor 6 is loaded into program memory 10 in island1, and the amount 81 of executable code for processor 7 is loaded into program memory 11 in island2.

Figure 12:
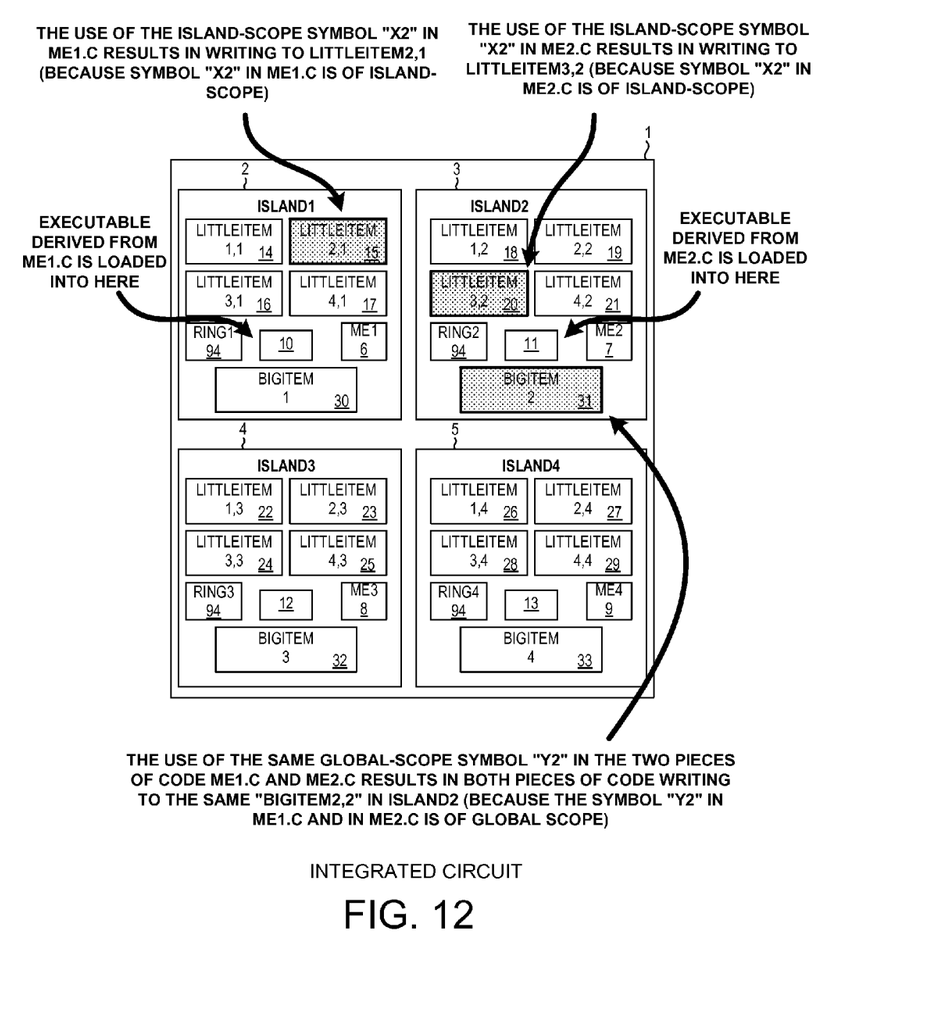
FIG. 12 is a diagram that illustrates results of the resource allocation performed by the link of the system of FIG. 2.

FIG. 12 is a diagram of the integrated circuit 1 that shows which resource instances were allocated as a result of the operation of the linker program 54. The use of the island-scope symbol X2 in source code ME1.C results in writing to resource instance littleitem2,1 15 located in island1 2, whereas use of the same symbol X2 of scope island in source code ME2.O results in writing to a different resource instance littleitem3,2 20 located in island2 3. The symbol Y2 is, however, global. Use of the global symbol Y2 in the two pieces of code ME1.C and ME2.O results in both pieces of code writing to the same bigitem register bigitem2 31 in island2 3.

Figure 13A:
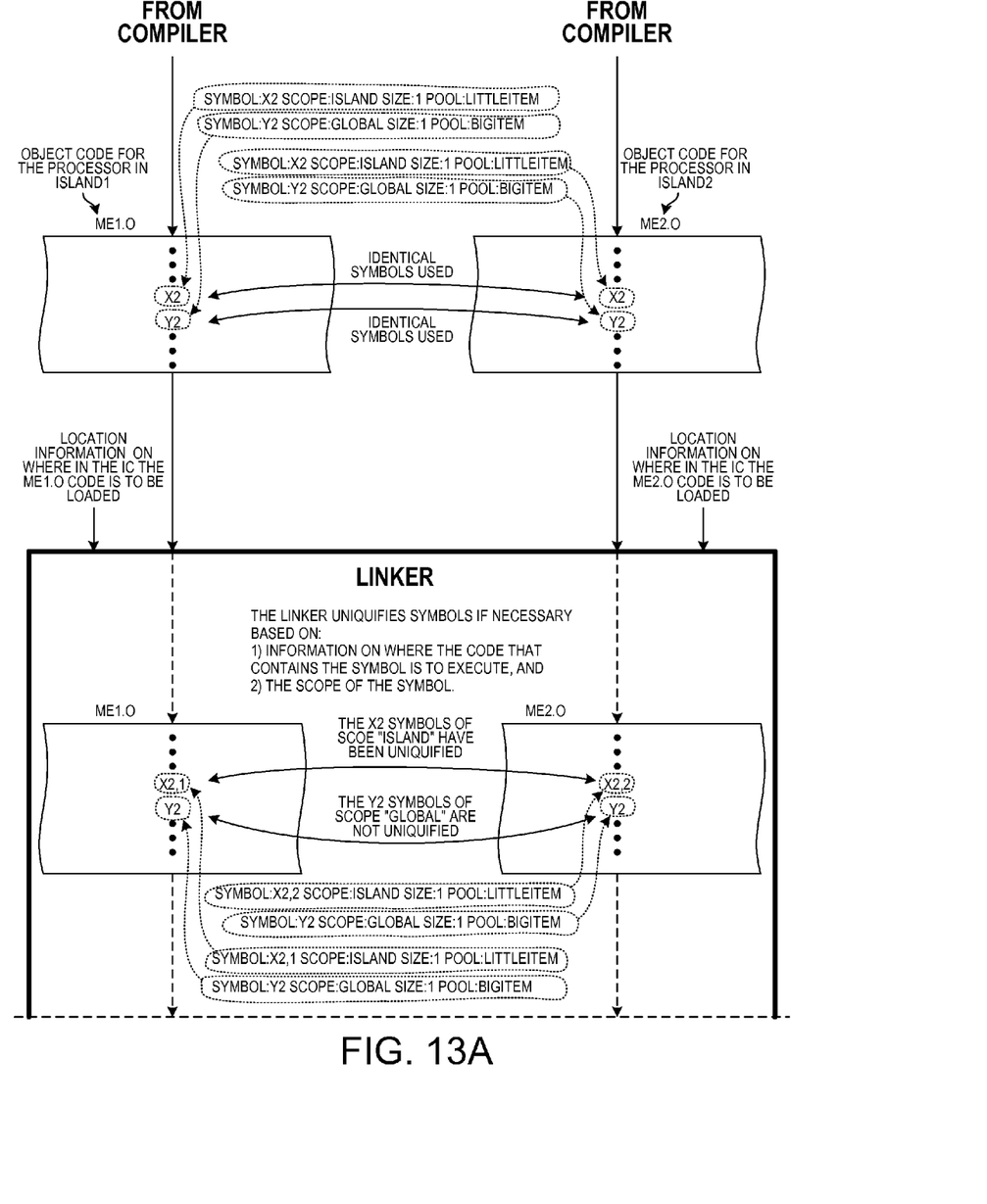
FIG. 13A is a first part of a larger FIG. 13.
Figure 13B:
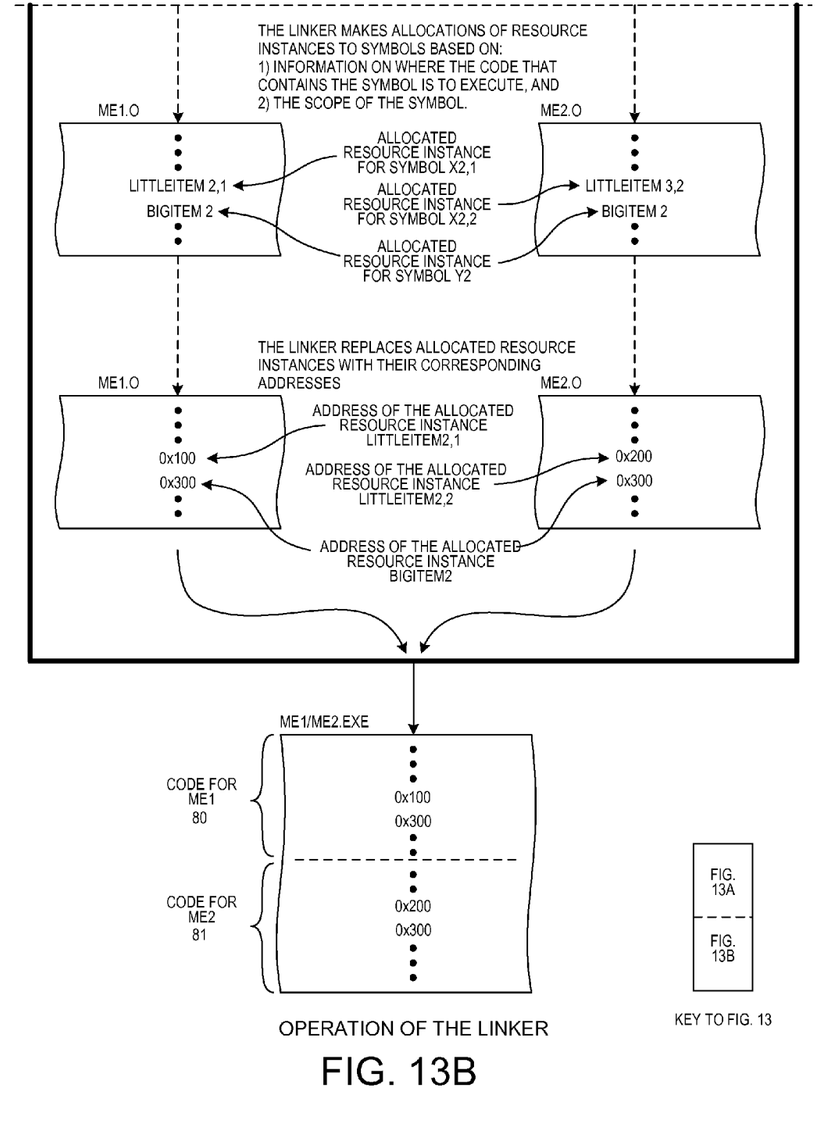
FIG. 13B is a second part of a larger FIG. 13. The larger

FIGS. 13A and 13B together form a larger figure, FIG. 13. FIG. 13 depicts the process flow described above in a more graphical form. There is an instance of symbol X2 and an instance of symbol Y2 in the object code ME1.O. There is an instance of the symbol X2 and an instance of the symbol Y2 in the object code ME2.O. The symbol X2 is set forth in an allocate instruction to be scope level "island", whereas the symbol Y2 is set forth in an allocate instruction to be of scope level "global". Instructions that indicate the scope level of the symbols X2 and Y2 are passed from the source code into the object code and are therefore available to the linker. In a first step, the linker uniquifies symbols as necessary based on: 1) information on where the code that contains the symbol is to execute, and 2) the scope level of the symbol. In a second step, the linker makes allocations of resource instances to symbols. In a third step, the linker replaces each instance of a symbol in the uniquified object code with the address of the resource instance that was allocated to the symbol, thereby generating executable code. The file ME1/ME2.EXE contains the executable code.

Although the simplified example set forth above only involves two scope levels of "global" and "island", the linker program 54 in another embodiment recognizes four scope levels: "global", "island", "processor", and "context" within a processor. Within an island there are multiple processors. Each of these processors has an associated amount of program memory from which it accesses executable program code. For each amount of object code, the location information 82 supplied to the linker program 54 indicates the processor into whose program memory the code is to be loaded, and also indicates the island that contains the processor. Accordingly, a symbol (for example, X2) can be uniquified at the processor level by declaring the symbol to have a scope level of processor. In such a case, source code for two processors executing code within the same first island can use the same source code symbol X2 to refer to two different resource instances within the first island. Similarly, source code for two processors executing code within the same second island can use the same source code symbol X2 to refer to two other different resource instances within the second island. In this way, instances of the source code symbol X2 in different amounts of code for different processors refer to resource instances that are unique within the code space for each processor. Alternatively, if the symbol X2 had been declared to be of scope island, then the multiple source code instances appearing the amounts of program codes of the different processors of the first island would all refer to the same one resource instance. Likewise, the multiple source code instances appearing the amounts of program codes of the different processors of the second island would all refer to the same one resource instance, but that resource instance would not be the same resource instance used by the processors in the first island. Alternatively, if the symbol X2 had been declared to be of scope global, then all instances of the symbol X2 would refer to the same one resource instance, regardless of where in the integrated circuit the code that contains the instances of symbol X2 are to be loaded.

Figure 14:
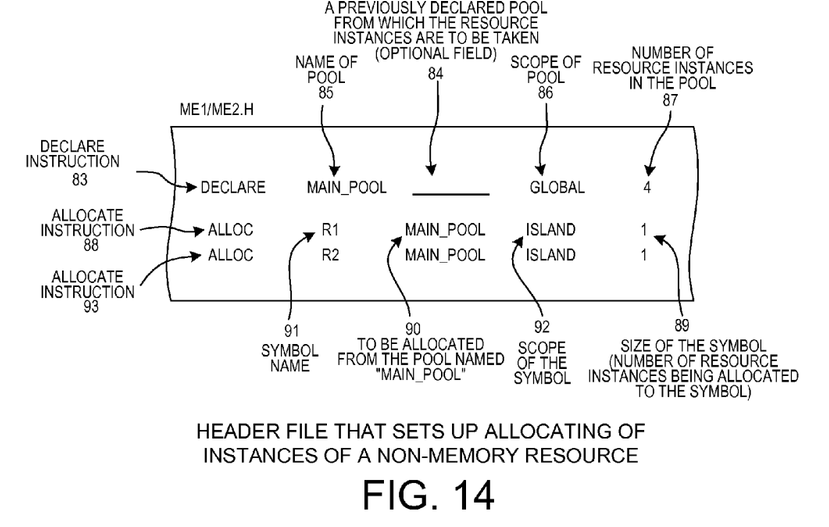
FIG. 14 is a diagram of a header file in accordance with a second novel aspect, where the header file is usable to set up a linker to allocate resource instances of a non-memory resource.

In a second novel aspect, the linker program 54 allocates instances of a non-memory resource. A declare instruction 83 in the ME1/ME2.H header file declares a pool to consist of four resource instances which the source code treats as the four hardware ring circuits 94-97. A ring here is a non-memory hardware communication circuit that includes an amount of logic circuitry in addition to a set of registers. A processor can interact with a ring via its registers. A processor can call an API for rings, where an argument of the API call identifies a particular ring and where another argument of the API call indicates the type of ring operation to be performed by the identified ring. In the same way that the API call described above results in the compiler replacing the API call in the source code with a set of machine code instructions to carry out a write to a register specified by the API call, the API call here relating to a ring is replaced by the compiler with a set of machine code instructions to carry out the ring operation specified by the API call. Ring operations that the API call can be used to perform include a ring "PUT" operation and a ring "GET" operation. Two processors that can communicate with the same ring circuit can use PUT and GET operations to communicate through the ring circuit with one another. If the API call is for a PUT operation, then a processor writes a value into a particular interface register of the specified ring circuit, and the ring circuit hardware then uses the information in the register to perform the remainder of the PUT operation. If the API call is for a GET operation, then the hardware of the ring circuit performs the GET operation and then loads into an interface register the value to be recovered from the ring. The processor then reads the interface register to complete the "GET" operation. In the declare instruction 83 of FIG. 14, the optional field 84 can be used to specify a previously declared pool from which the resource instances (being declared to be of pool "MAIN_POOL") are taken. The field 85 of the declare instruction 83 indicates that the name of the pool will be "MAIN_POOL". The field 86 indicates that the scope level of MAIN_POOL is global. The field 87 indicates that four resource instances will make up MAIN_POOL.

In addition to the declare instruction 83, the header file ME1/ME2.H also contains one or more allocate instructions for non-memory resources. An allocate instruction is an instruction to the linker to allocate a resource instance to be associated with a symbol. In the example allocate instruction 88 of FIG. 14, the allocate instruction instructs the linker program 54 to allocate one of the four resource instances of the pool "MAIN_POOL" to be associated with the symbol R1. Field 89 indicates that one resource instance of pool MAIN_POOL, as indicated by field 90, will be allocated to be associated with the symbol name R1 appearing in field 91. Field 92 indicates that the scope level of symbol R1 will be "island". Similarly, the allocate instruction 93 instructs the linker program 54 to allocate another of the four resource instance of the pool "MAIN_POOL" to be associated with the symbol R2. Thereafter in the source code, the programmer can refer to ring R1 and R2. At link time, the linker will handle allocating an appropriate one of the available resource instances of the pool MAIN_POOL to each of the symbols R1 and R2. After the API calls in the source code for the rings have been replaced by machine code instructions, the instances of the symbol R1 in the code will be replaced with the base address for ring R1, and the instances of the symbol R2 will be replaced with the base address for ring R2. In the present example, the base address for ring RING1 is 0x500 and the base address for ring RING2 is 0x600. The base address for each of RING1, RING2, RING3 and RING4 is fixed and determined by the hardware of the integrated circuit. Note that in the symbol table of FIG. 8 the 0x500 base address is present in the row for RING1 and that the 0x600 base address is present in the row for RING2. The API machine code in the object code uses the supplied base address of ring as an offset to calculate the actual addresses of the appropriate interface registers within the ring hardware to be accessed in order to carry out the ring operation being specified. Resource instances of non-memory resources can be allocated in this way using the declare and allocate instructions without the user of API calls.

In a more simple case, an instance of a non-memory resource is allocated to a symbol. Afterward when the linker encounters the symbol in the object code, the linker replaces all instances of the symbol with the value (address) of the instance of the non-memory resource. The example of a hardware ring circuit is just an example of one possible type of non-memory resource that can be allocated using the novel linker. In another example, the integrated circuit includes several event filter circuits. An allocate instruction is usable to allocate one of these event filter circuits with a symbol. In some embodiments, after allocation, the linker replaces instances of the symbol with the base address of the particular event filter that was allocated, thereby generating an amount of executable code. In other embodiments, after allocation, the linker replaces bits within the object file associated with instances of the symbol with a value associated with a symbol of the particular event filter that was allocated, thereby generating an amount of executable code.

Figure 15:
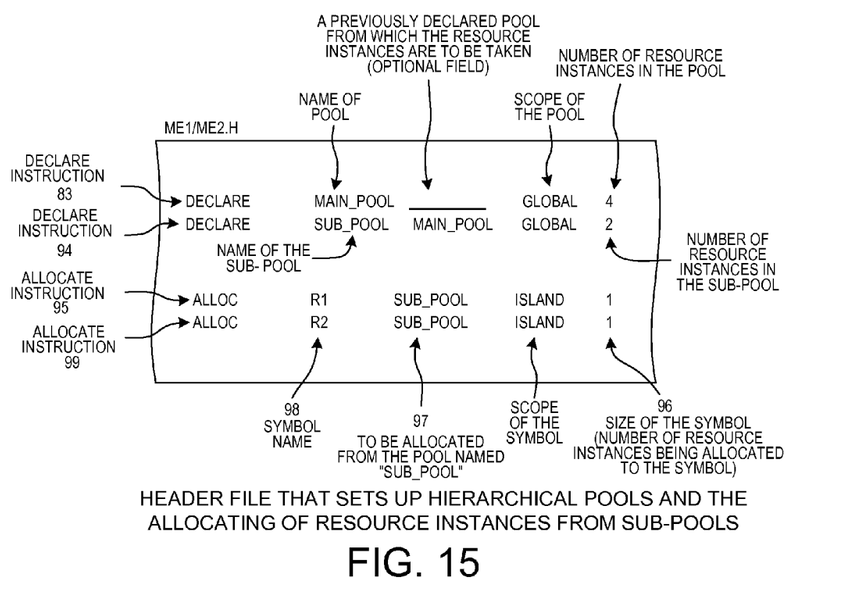
FIG. 15 is a diagram of a header file in accordance with a third novel aspect, where the header file usable to set up a linker to allocate from pools and/or sub-pools of a hierarchy of pool and sub-pools.

In a third novel aspect, a hierarchy of pools and sub-pools of resource instances are declared, and then the linker program 54 makes allocations out of the pools and/or the sub-pools. FIG. 15 illustrates how the header file ME1/ME2.H can be used to declare a pool MAIN_POOL, and also to declare a sub-pool SUB_POOL taken from the resource instances in the MAIN_POOL. As in the example of FIG. 14, declare instruction 83 declares a pool of four resource instances that will be called MAIN_POOL. In the example of FIG. 15, however, a second declare instruction 94 declares a pool of two resource instances called SUB_POOL to be taken from the previously declared MAIN_POOL. In a first allocate instruction 95, the linker program 54 is instructed to allocate one of the resource instances of the previously declared pool called SUB_POOL to be associated with the symbol R1. That one resource instance is being allocated is indicated by field 96. That the resource instance is to be taken from SUB_POOL is indicated by field 97. The name of the symbol is indicated by field 98. In a second allocate instruction 99, the linker program 54 is instructed to allocate another of the rings of the previously declared pool called SUB_POOL to be associated with the symbol R2. As indicated by this example, a hierarchy of pools is declared, and allocations can then be made from pools and/or from sub-pools of the hierarchy using allocate instructions.

Although certain specific embodiments are described above for instructional purposes, the teachings of this patent document have general applicability and are not limited to the specific embodiments described above. Although the compiler, linker and loader programs are described above as being stored in program memory in the computer 51 as one example of a processor-readable medium, the compiler, linker and loader can be stored on other processor-readable media such as on a magnetic medium (such as a hard disc) and/or on an optical medium (such as a CD or DVD) and/or in a semiconductor memory (such as a portable memory stick device). Accordingly, various modifications, adaptations, and combinations of various features of the described embodiments can be practiced without departing from the scope of the invention as set forth in the claims.

What is claimed is:

1. A method comprising:
    (a) receiving a first amount of code, onto a compiler, wherein the first amount of code includes an allocate instruction and an API (Application Programming Interface) call, wherein the allocate instruction includes a symbol that identifies one of a plurality of non-memory resource instances and the allocate instruction further includes a scope level value, wherein the scope level value indicates a scope level of the symbol of the allocate instruction, which is a circuit level of a circuit hierarchy, wherein the API call is a call to perform an operation on one of a plurality of non-memory resource instances, wherein the API call also includes the symbol, and wherein said one of the non-memory resource instances is indicated by the symbol of the API call and the non-memory resource instances are hardware circuits;
    (b) replacing, by the compiler, the API call in the first amount of code with a plurality of API instructions, wherein the plurality of API instructions include the symbol;
    (c) receiving, onto a linker, location information indicting where the plurality of API instructions are to be loaded in a circuit;
    (d) generating, by the linker, a modified symbol using the location information and the scope level value, wherein the modified symbol is unique within the scope level indicated by the scope value;
    (e) replacing, by the linker, the symbol in the plurality of API instructions with the modified symbol;
    (f) allocating, by the linker, a value to be associated with the symbol, wherein the value is one of a plurality of values, and wherein each value of the plurality of values corresponds to a respective one of the plurality of non-memory resource instances; and
    (g) generating, by the linker, a second amount of code, wherein the second amount of code includes the API instructions, and wherein the API instructions are for using the value allocated in (f) to generate an address of a register and are for using the address of the register to perform an access of the register, wherein the register is a register within said one of the non-memory resource instances.

2. The method of claim 1, wherein the API call is a call to perform a configuration operation on said one of the plurality of non-memory resource instances.

3. The method of claim 1, wherein the API call is a call to perform write to a configuration register of said one of the plurality of non-memory resource instances.

4. The method of claim 1, wherein the API call is a call to perform a PUT operation to said one of the plurality of non-memory resource instances.

5. The method of claim 1, wherein the API call is a call to perform a GET operation from said one of the plurality of non-memory resource instances.

6. The method of claim 1, wherein the non-memory resource instance is a hardware communication circuit, and wherein the API call is a call to write a data value to the hardware communication circuit.

7. The method of claim 1, wherein the non-memory resource instance is a hardware communication circuit, and wherein the API call is a call to read a data value from the hardware communication circuit.

8. The method of claim 1, wherein the non-memory resource instance is a hardware event filter circuit, and wherein the API call is a call to write a value to the hardware event filter circuit.

9. The method of claim 1, wherein the non-memory resource instance is a hardware event filter circuit, and wherein the API call is a call to read a value from the hardware event filter circuit.

10. The method of claim 1, wherein the allocate instruction further includes a name of a pool, and wherein the name of the pool is a name for the plurality of non-memory resource instances.

11. The method of claim 1, wherein the allocate instruction further includes a scope level value, and wherein the scope level value indicates a scope level of the symbol of the allocate instruction.

12. The method of claim 1, wherein one of the plurality of non-memory resource instances includes no processor that fetches, decodes and executes instructions.

13. The method of claim 1, wherein the plurality of values is a plurality of bits, and wherein the value that is allocated in (f) is a bit number of a bit of the plurality of values.

14. A non-transitory processor-readable storage medium having stored thereon a program of computer-executable instructions, wherein execution of the program by the computer causes the computer to perform steps comprising:
    (a) receiving a first amount of code, onto a compiler, wherein the first amount of code includes an allocate instruction and an API (Application Programming Interface) call, wherein the allocate instruction includes a symbol that identifies one of a plurality of non-memory resource instances and the allocate instruction further includes a scope level value, wherein the scope level value indicates a scope level of the symbol of the allocate instruction, which is a circuit level of a circuit hierarchy, wherein the API call is a call to perform an operation on one of a plurality of non-memory resource instances, wherein the API call also includes the symbol, and wherein said one of the non-memory resource instances is indicated by the symbol of the API call and the non-memory resource instances are hardware circuits;
(b) replacing, by the compiler, the API call in the first amount of code with a plurality of API instructions, wherein the plurality of API instructions include the symbol;
(c) receiving, onto a linker, location information indicting where the plurality of API instructions are to be loaded in a circuit;
(d) generating, by the linker, a modified symbol using the location information and the scope level value, wherein the modified symbol is unique within the scope level indicated by the scope value;
(e) replacing, by the linker, the symbol in the plurality of API instructions with the modified symbol;
(f) allocating, by the linker, a value to be associated with the symbol, wherein the value is one of a plurality of values, and wherein each of the values corresponds to a respective one of the plurality of non-memory resource instances; and
(g) generating, by the linker, a second amount of code, wherein the second amount of code includes the API instructions, wherein the API instructions are for converting the value allocated in (f) into an address of a register and for using the address of the register to perform an access of the register, and wherein the register is a register within said one of the non-memory resource instances.

15. The non-transitory processor-readable storage medium of claim 14, wherein the first amount of code further includes a declare instruction, wherein the declare instruction declares a pool of the non-memory resource instances, and wherein the allocate instruction is an instruction to allocate from the pool.

16. The non-transitory processor-readable storage medium of claim 14, wherein the register is a configuration register.

17. The non-transitory processor-readable storage medium of claim 14, wherein the allocate instruction further includes a scope level value, and wherein the scope level value indicates a scope level of the symbol of the allocate instruction.

18. A method comprising:
(a) receiving an allocate instruction and an API (Application Programming Interface) call, onto a compiler, wherein the allocate instruction includes a symbol that identifies one of a plurality of non-memory resource instances and the allocate instruction further includes a scope level value, wherein the scope level value indicates a scope level of the symbol of the allocate instruction, which is a circuit level of a circuit hierarchy, wherein the API call is a call to perform an operation on one of a plurality of non-memory resource instances, wherein the API call also includes the symbol, and wherein said one of the non-memory resource instances is indicated by the symbol of the API call and the non-memory resource instances are hardware circuits; and
(b) replacing, by the compiler, the API call with a plurality of instructions, wherein the plurality of API instructions include the symbol;
(c) receiving, onto a linker, location information indicting where the plurality of API instructions are to be loaded in a circuit;
(d) generating, by the linker, a modified symbol using the location information and the scope level value, wherein the modified symbol is unique within the scope level indicated by the scope value;
(e) replacing, by the linker, the symbol in the plurality of API instructions with the modified symbol;
(f) allocating, by the linker, a value to be associated with the symbol, wherein the value is one of a plurality of values, and wherein each value of the plurality of values corresponds to a respective one of the plurality of non-memory resource instances; and
(g) using the value allocated in (f) to generate an amount of executable code, wherein the amount of executable code is for causing a register within said one of the non-memory resource instances to be accessed.

* * * * *